Dec. 24, 1968    C. F. LUCY ET AL    3,417,697
PROJECTILE
Filed Oct. 19, 1966

INVENTORS
CARL F. LUCY
and
HAROLD J. WOODS

BY William Grobman

ATTORNEY

United States Patent Office 3,417,697
Patented Dec. 24, 1968

3,417,697
PROJECTILE
Carl F. Lucy, Mountain View, and Harold J. Woods, San Benito County, Calif., assignors to General Precision Systems Inc., a corporation of Delaware
Filed Oct. 19, 1966, Ser. No. 587,809
6 Claims. (Cl. 102—41)

ABSTRACT OF THE DISCLOSURE

Firearms and projectiles which do not reveal themselves by a flash of light and loud noise have been desired for a long time. This disclosure describes a special cartridge which fulfills that desire. A metal housing is perforated longitudinally to accept a projectile. An explosive-filled chamber is provided at one end of the cartridge and the perforation at the other end of the cartridge is about the same diameter as the projectile. Between the two is a chamber larger than the projectile which contains a piston formed of a malleable material. Firing the cartridge causes the explosive charge to explode, generating gas at high pressure. The gas pressure pushes forward the piston which accelerates the projectile. As the piston reaches the end of its chamber, it is compressed by a sloping forward portion to seal into the cartridge the exploding gas. The projectile continues free on its own momentum.

---

This invention relates to a projectile and, more particularly, to a projectile which enables the stealthy application of a foreign agent into the body of an animal.

At one time in the recent past, the profession of acquiring wild animals alive for zoos, research facilities, museums, and the like, and that of the general care of living large animals were very dangerous. More recently, developments in modern transportation and communication equipment, new materials, and improvements in biological chemicals have all cooperated to reduce the danger of these jobs. In fact, one of the latest techniques for handling wild animals has been by shooting a capsule of a biological chemical into the body of the animal and then waiting until the chemical acts upon the animal to tranquilize or otherwise render him readily available for manipulation. Thus, in zoos when dental work is required on large animals, they are usually first tranquilized or rendered unconscious so that the dentist can perform his functions. It must be realized, of course, one of the greatest causes of the rapid depletion of our milk herds is often the result of poor teeth and the cows' inability to eat enough to keep them alive and in good condition. To a carnivorous animal, teeth are even more important.

In addition, where at one time it was necessary to trap a large wild animal in his environment and then secure him by ropes and cables and the like so that he could be transported abroad, modern improvements have enabled the hunter to render his quarry unconscious by the use of chemicals so that he may be more easily handled. Under the earlier methods, both men and animals were often seriously injured. Newer techniques have decreased injury to both the hunted and the hunter. However, even with the improvements in modern chemical devices there is the need for better equipment for driving the chemicals into the animal to be injected. Capsules containing chemicals do not usually have good ballistic qualities and they are often useful only at very short ranges, and even then present a serious problem with accuracy. In an animal's natural habitat, a miss may often be fatal to man or beast, particularly since the devices used to propel the chemical capsules toward the animal are usually modified guns. Guns betray their presence by the noise and flash of the explosion and by the sound of the projectile as it travels through space. Improvements in the means to carry the chemical agent to an animal body are both desirable and necessary.

It is an object of this invention to provide a new and improved apparatus for applying chemical agents to living bodies.

It is another object of this invention to provide a new and improved device for penetrating a living body with a projectile.

It is a further object of this invention to provide a new and improved means for penetrating a living body with a projectile, which means is not self-revealing.

Other objects and advantages of this invention will become more apparent as the following description proceeds, which description should be considered together with the accompanying drawings in which.

Figure 1:
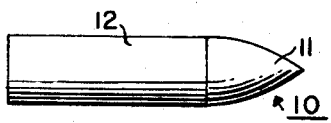
FIG. 1 is a side view of a projectile according to this invention.
Figure 2:
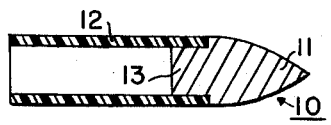
FIG. 2 is a sectional view of the projectile of FIG. 1.

Referring now to the drawings in detail and, more particularly, to FIGS. 1 and 2, the reference character 10 generally designates the over-all projectile used in this invention. The projectile comprises a heavy forward portion 11, which has a conical shaped front end, and a generally hollow cylindrical tail portion 12. The aft end 13 of the front portion 11 has a slightly reduced diameter over which the tail portion 12 is placed. The forward portion 11 is made of a heavy material, usually one which is also hard. The tail portion 12, however, is lightweight and is generally hollow to additionally reduce its weight. This places the center of gravity well forward of center on the projectile 10. When the projectile is in flight and there is a tendency to tumble about its center of gravity, the forces on the tail portion 12 created by the motion through the air are greater than the forces upon the front portion 11, and the projectile 10 is stabilized. Thus, the projectile 10 need not be ejected from a rifled barrel.

As indicated above, using projectiles fired from a propulsion device to inject a living body with a chemical agent is not new. However, it is desirable in many cases to be able to fire the projectile toward the target without any tell-tale flash or noise. To accomplish this the apparatus shown in FIG. 3 has been developed. This apparatus comprises a generally cylindrical body or housing 21 having a bore 22 large enough to pass the projectile 10. The housing 21 has an interior cavity 23 which has a tapered forward portion 24 in which the diameter of the interior cavity 23 is gradually reduced to the diameter of the smaller bore 22. A seal 25 of any suitable material, such as a synthetic resin, is placed at the end of the tapered portion 24 adjacent the end of the bore 22. The front end 11 of a projectile is shown fitting tightly in the perforation in the seal 25, which grips the projectile 11 tightly enough to prevent it from falling out in handling, and extending into the bore 22. The tail portion 12 of the projectile is situated generally centrally within the cavity 23, and an elongated extension 28, or rod, of a piston 27 passes through the opening in the tail 12 so that the front portion of the extension 28 rests against the back portion 13 of the projectile. The portion of the extension 28 immediately adjacent the piston 27 is surrounded by a block 26 of a relatively soft material. Sealing the piston 27 from a large chamber 31 in the housing 21 is a gas seal 29 which may be formed of any suitable material. A primer cap 32, which may be of standard construction, is fitted in an enlarged portion of the chamber 31 from one end of the housing 21. In summary, the device shown in FIG. 3 comprises a housing 21 which has a series of internal chambers with the largest diameter chamber at one end holding a primer cap and the smallest diameter chamber at the other end through which the projectile passes.

Figure 3:
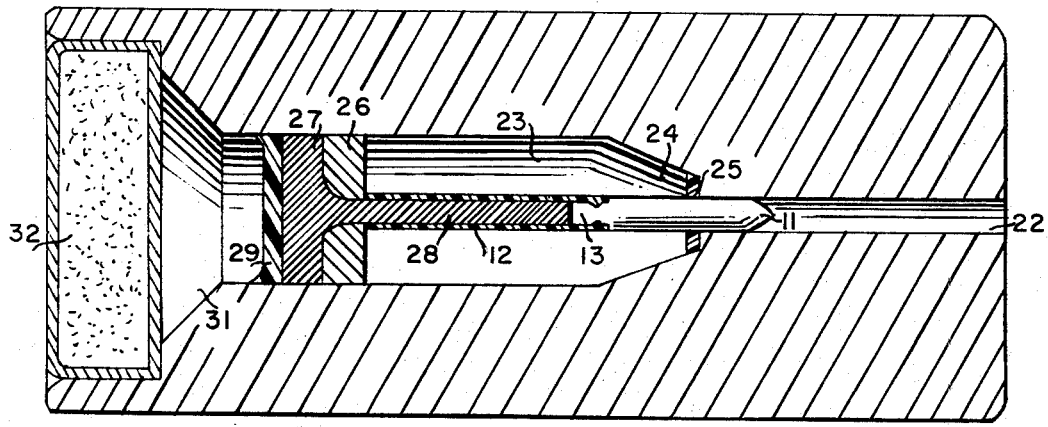
FIG. 3 is a sectional view of the apparatus of this invention.

In operation, the housing 21 is usualy formed of such size and shape as to fit into the firing chamber of a standard bore gun. The gun could be almost any size from a large artillery weapon to a small hand-held pistol. The device of FIG. 3 is fired in the same manner as the standard shell in the weapon being used. Percussion on the primer 32 causes the primer to explode liberating expanding gases which expand into the chamber 31. The expanding gases apply a force against the gas seal 29 and against the piston 27. Thus, the piston 27, together with the gas seal 29, is moved forward in the chamber 23 driving before it the block 26 and the projectile. Since the forward end of the extension 28 rests against the aft end 13 of the hard front portion 11 of the projectile, the forward movement of the piston 27 is directly transmitted to the heavy mass of the projectile. In this manner, the projectile is rapidly accelerated forwardly. When the block 26, which is usually made of a relatively soft material, such as aluminum (the casing 21 is usually made of steel), reaches the tapered portion 24 of the chamber 23, the energy of the piston 27 and the block 26 is absorbed by the gradual deformation of the block 26 against the sloping walls of the tapered portion 24. In addition, the impact of the deformed block 26 against the plastic seal 25 serves better to completely seal the chamber 23 so that all of the gases evolved by the firing of the primer 32 are kept within the chamber 23. When the primer 32 fires, its casing is expanded tightly against the internal walls of the housing 21 to prevent the leak of expanded gases outwardly in the rearward direction. If necessary to insure a better seal, the inner diameter of the housing 21 adjacent the inside end of the primer 32 can be undercut to a larger internal diameter to form an internal groove so that the force of the expanding gas from the primer 32 will expand the metal casing of the primer 32 and cause it to seat better in this larger diameter undercut. The primer may be any standard primer, such as a Winchester number 2½. By the time the block 26 has come to rest against the seal 25, the projectile has been forced completely clear of the housing 21 and is on its way toward the target. The extension 28 of the piston 27 is seated in the bore 22, and the seal 25 and the block 26 are tightly compressed around the extension 28 to seal both the sound and the light of the exploding primer completely in the housing 21. Usually the seal 25 grips the projectile 11 with enough force to keep it in place during handling and is not depended upon to seal in the gases. However, should the seal 25 fit about the projectile 11 sufficiently tightly to form a gas seal, the air in the chamber 23 is compressed by the block 26 and further serves to gradually decelerate the piston 27 and its rod 28. When the end of the tail 12 clears the seal 25, the compressed air in the chamber 23 expands against the back of the projectile 11 to give further impetus. In addition, the size of the primer 32 must be selected together with the size of the projectile so that the projectile is ejected from the housing 21 with a speed slightly less than the speed of sound. This provides the launching of a projectile completely silently and without any indication of the source. Thus, should the first projectile miss the target, a second, and third, and fourth projectile can be fired without detection. This is extremely important in the case of larger animals where a plurality of injections may be required to accomplish the necessary results. The injections can be made without the animal being frightened by a flash of light or the thunder of an exploding shell.

Figure 4:
FIG. 4 is a perspective view of a modification of the stabilization tail of the projectile of FIG. 2.

Of course, modifications of the projectile of this invention are feasible. For example, FIG. 4 illustrates a second embodiment of the tail section for the projectile 10. The tail section 41 shown in FIG. 4 comprises a generally cylindrically shaped forward portion 42 and a cross-shaped rearward portion 43. The idea of the tail section 41, as explained above, is to provide an elongated lightweight stabilizing means for the projectile as a whole. This stabilizing means prevents the projectile from tumbling in flight, increases its range, and increases its accuracy. To accomplish this purpose, the tail section 41 must be light in weight. The tail section 12 illustrated in FIG. 2 was generally cylindrical in shape and depended solely upon its extended lightweight length behind the center of gravity to accomplish its purpose. The rear portion 43 of the tail section 41, on the other hand, is finned, and the fins help provide additional stabilization for the projectile. Of course, when a tail section of this type is used in the apparatus of FIG. 3, either the extension 28 of the piston 27 must be substantially shortened so that it can bear against the rear portion 43 of the tail section 41, or the center of the tail 41 should be perforated with a small diameter opening and the extension 28 of the piston 27 must have a small enough diameter to pass through this smaller perforation. In operation, the lightweight tail section 41, when attached to the back end of the heavier forward portion of the projectile, provides a means for counteracting the normal tumbling forces which occur on a projectile in flight. The air currents are guided by the fins 43 and add to the stabilization of the entire projectile. It must be borne in mind that even though the rear end 43 of the tail section 41 is finned and may, therefore, be solid, the tail section as a whole must be extremely light in weight.

Figure 5:
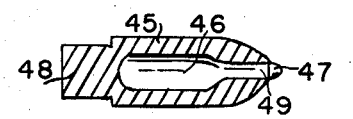
FIG. 5 is a modification of the projectile of FIG. 2.

In addition to changes in the shape of the tail section, the heavier forward portion of the projectile may also vary in its construction. An example of this is illustrated in FIG. 5. As mentioned above, the projectile of this invention may be used to apply chemical agents to the interior of a living body. To accomplish this purpose, the projectile of FIGS. 1 and 2 and 3 would probably be dipped in the chemical agent to be applied, and when the projectile itself penetrated the body of the target, the coating which was carried thereby would be applied to the interior of that body. This procedure applies a very small amount of a chemical agent to the target, and when the target is a large animal, a plurality of projectiles may be required to accomplish the desired results. The device of FIG. 5, however, is designed to overcome this disadvantage. The forward portion 45 comprises an internal hollow cavity 46 which is connected with the forward end of the section 45 by means of a narrow passageway. The forward end of the narrow passageway is sealed by a frangible tip 47. The rear portion 48 has a smaller diameter which carries the tail section, not shown. In use, the hollow opening 46 of the forward portion 45 is filled with a chemical agent to be deposited in the target body. When the projectile is fired as described above, the chemical agent stored in the cavity 46 is carried with the projectile Upon striking the target, the frangible tip 47 breaks off leaving the passageway connected to the internal cavity 46 open. The fluid contents of the cavity 46 are expelled into the target body through the passageway 49 to accomplish the desired purpose. In this manner, a comparatively large amount of chemical agent is readily deposited in the target body.

Figure 6:
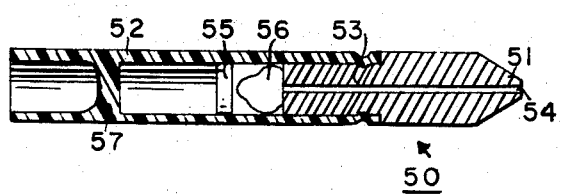
FIG. 6 is a sectional view of a modification of the over-all projectile of FIG. 2.

Another modification of the projectile is shown in section in FIG. 6. The projectile 50 comprises a forward portion 51 formed of a relatively heavy and preferably hard substance such as a metal. A tail portion 52, which is generally cylindrical in shape, fits over the aft end 53 of the front portion 51. A narrow passageway 54, or plurality of such passageways if desired, extends through the forward portion 15 from one end to the other. The tail section 52 contains an internal partition 57, and a weight 55 is freely contained in the forward end of the tail portion 52. Between the weight 55 and the back end of the forward portion 51 is a frangible container 56 of the chemical agent to be applied to the target.

The tail partition 57 is constructed to receive the thrust applied to the entire projectile 50 by the extension 28 of the piston 27. This type of device must be used with a piston 27 having an extension 28 of an appropriate length. The projectile 50 is expelled from the housing 21 as described above in connection with the description of FIG. 3. When the forward portion 51 of the projectile 50 strikes the target, it is rapidly decelerated. The weight 55, which is slidably mounted within the hollow portion of the tail section 52, moves forward under its own momentum and collapses the container 56. The container 56 may be formed of a film plastic, glass, or other readily breakable substance. Once the container 56 is broken, the weight 55 continues to move forward and acts as a piston, driving before it the chemical agent which was contained in the container 56. The chemical agent is thereby forced through the narrow passages 54 in the forward portion 51 and is effectively injected internally into the body of the target. In addition to the above forms of the device shown, other modifications could readily be made. For example, the tail section of one of the projectiles could contain a gas under pressure behind a body of chemical agent which is trapped in the hollow portion of the projectile by means of a frangible tip. When the tip is broken upon striking the target, the gas under pressure forces the chemical agent through the now opened passageway into the body of the target.

The above specification has described new and improved devices for applying chemical agents to living bodies without frightening the host by the normal loud explosion and flash of light associated with present-day rapid propulsion equipment. It is realized that a reading of this specification may indicate to those skilled in this field additional ways in which the principles of this invention may be used without departing from its spirit. It is, therefore, intended that this invention be limited only by the scope of the appended claims.

What is claimed is:

1. A self-contained cartridge for use in a standard gun without modification of either gun or cartridge, said cartridge comprising a housing having an interior cavity extending from one end of said housing partially therethrough, a comparatively small diameter bore extending from the other end of said housing to said cavity and adapted to receive and guide a projectile, said projectile comprising a heavy head portion and a lightweight hollow tail portion, a piston mounted in said cavity for movement therein from a withdrawn position to an extended position, said extended position being adjacent said bore, said piston comprising a head portion and an elongated extension having a reduced diameter and adapted to fit within the hollow tail of said projectile, means sealing said one end of said housing for supplying said cavity with fluids under pressure to drive said piston and said elongated extension from said withdrawn position to said extended position with said piston adjacent to and said elongated extension in said bore, and means operative to seal said cavity and said bore to prevent the escape of fluids under pressure when said piston is in its extended position.

2. The apparatus defined in claim 1 wherein said interior cavity comprises a first portion which is cylindrical in nature and has a fixed diameter sufficient to permit movement of said piston and a second portion having a gradually reduced diameter which serves to connect said fixed diameter portion with said bore.

3. The apparatus defined in claim 2 further including a block of comparatively soft material contained within the first portion of said interior cavity immediately adjacent said piston, said block being adapted to be deformed when it is forced into said second portion of said cavity.

4. The apparatus defined in claim 3 wherein said elongated extension has a diameter sufficiently small to freely pass into said bore, said block being formed to surround said extension and to provide a gas-tight seal between the walls of said second portion of said cavity and said extension when said block is driven into said second portion.

5. The apparatus defined in claim 2 wherein said means for supplying fluid under pressure comprises means responsive to an external signal to generate expanding gases, and wherein said interior cavity includes a third portion sufficiently large to accommodate said source of expanding gases.

6. The apparatus defined in claim 5 wherein said external signal is a percussion signal.

References Cited
UNITED STATES PATENTS

| | | | |
|---|---|---|---|
| 1,416,827 | 5/1922 | Holmes. | |
| 1,416,828 | 5/1922 | Holmes. | |
| 1,815,300 | 7/1931 | Harris | 102—92 |
| 2,348,337 | 5/1944 | Francis | 102—92 |
| 2,499,379 | 3/1950 | Garrett | 89—1.01 |
| 3,040,326 | 6/1962 | De Caro | 102—38 X |
| 3,093,077 | 6/1963 | Harris et al. | 102—92 |
| 3,209,696 | 10/1965 | Palmer et al. | 102—92 |
| 3,326,084 | 6/1967 | Barbieri et al. | |

ROBERT F. STAHL, *Primary Examiner.*

U.S. Cl. X.R.

102—92